United States Patent [19]

Yamano et al.

[11] Patent Number: 4,793,649
[45] Date of Patent: Dec. 27, 1988

[54] FOLDING SEAT

[75] Inventors: Eiichi Yamano; Takashi Yamashita, both of Kanagawa, Japan

[73] Assignee: Ikeda Bussan Co., Ltd., Ayase, Japan

[21] Appl. No.: 55,367

[22] Filed: May 29, 1987

[30] Foreign Application Priority Data

Jun. 18, 1986 [JP] Japan .............................. 61-92590[U]

[51] Int. Cl.⁴ .............................................. B60N 1/02
[52] U.S. Cl. .................................... 296/65.1; 297/367
[58] Field of Search ............... 296/65 R, 63; 297/366, 297/367, 379

[56] References Cited

U.S. PATENT DOCUMENTS

| | | | |
|---|---|---|---|
| 3,957,312 | 5/1976 | Bonnaud ......................... | 297/366 X |
| 4,312,537 | 1/1982 | Lindenberg ...................... | 297/379 X |
| 4,368,916 | 1/1983 | Blasin ............................ | 296/65 R X |
| 4,484,776 | 11/1984 | Gokimoto et al. ............... | 296/65 R |
| 4,627,656 | 12/1986 | Gokimoto et al. ............... | 296/65 R |

FOREIGN PATENT DOCUMENTS 61-190729 11/1986 Japan .

Primary Examiner—Robert B. Reeves
Assistant Examiner—Russell D. Stormer
Attorney, Agent, or Firm—Foley & Lardner, Schwartz, Jeffery, Schwaab, Mack, Blumenthal & Evans

[57] ABSTRACT

Herein disclosed is a folding seat which comprises first and second side arms each being pivotally mounted on a floor, a seatback secured to the side arms to move therewith, a seat cushion connected to the side arms in a manner to be pivotal between a horizontal in-use position and an upright folded position, a first latching mechanism for latching the seat cushion when the same assumes the two positions selectively, a second latching mechanism for latching the second side arm when the same is raised up to its upright position, a third latching mechanism for latching the first side arm when the same is raised up to its upright position, and an unlatching mechanism for making the second latching mechanism inoperative when the seat cushion is pivoted to its upright folded position.

10 Claims, 5 Drawing Sheets

FOLDING SEAT

BACKGROUND OF THE INVENTION

1. Field of the Invention

The present invention relates in general to a folding seat for motor vehicles, such as trucks, delivery vans or the like, which is foldable to increase the luggage space of the vehicle. More specifically, the present invention is concerned with a folding seat which, upon requirement of seat folding, is entirely inclinable forward with the seat cushion folded on the seatback.

2. Description of the Prior Art

In order to clarify the task of the present invention, one conventional folding seat 100 will be outlined with reference to FIGS. 5, 6 and 7. The folding seat 100 illustrated in the drawings is mounted on a floor 200 of a delivery van at the position near a depressed foot space 202 defined by the floor 200.

As is seen from FIG. 5, the conventional folding seat 100 comprises a pair of side arms 102 which are pivotally connected at their lower ends to laterally spaced side portions of the vehicle body through respective pivot shafts 104. Designated by numeral 106 is a base plate which assures the pivotal connection of each side arm 102 to the vehicle body. A seat cushion 108 is pivotally connected at its rear side ends to the respective side arms 102 through pivot pins 110. A seatback 112 is securely connected at its lower side ends to the side arms 102 to move therewith. When, as is illustrated by a solid line in FIG. 5, the seat 100 assumes its in-use position, the side arms 102 are latched at their raised positions holding the seat cushion 108 and the seatback 112 at the horizontal and upright positions respectively.

Upon requirement of seat folding, the seat cushion 108 is pivoted upward about the pivot pins 110 to its upright folded position as illustrated by a phantom line in FIG. 5, and then the seatback 112 is pivoted forward about the pivot shafts 104 together with the folded seat cushion 108 until they are fully received in the depressed foot space 202 of the floor 200 as is seen from FIG. 6.

However, due to its inherent construction, the conventional folding seat 100 as described hereinabove has the following drawback.

That is, the forward inclination of the seatback 112 for the full seat folding should be carried out very carefully by using both hands of an operator in order to hold the seat cushion 108 at its folded position. If, as may be understood from FIG. 7, the forward inclination of the seatback 112 is carried out without holding the seat cushion 108, the latter will suddenly drop from the folded position and collide against the bank of the depressed foot space 202 of the floor 200. The collision not only generates uncomfortable noise but also damages the seat cushion 108. Furthermore, the sudden drop of the seat cushion 108 may cause a person to get hurt in his foot.

SUMMARY OF THE INVENTION

It is therefore an object of the present invention to provide a folding seat which is free of the above-mentioned drawback.

According to the present invention, there is provided a folding seat which is equipped with a latching mechanism which keeps the seat cushion at its folded position during forward inclination of the entire of the seat for the full folding of the same.

According to the present invention, there is provided a folding seat for use on a floor, which comprises first and second spaced side arms each having a lower end pivotally connected to the floor, each arm being pivotal between an upright position and a folded position with respect to the floor, a seatback secured to the first and second spaced side arms to move therewith, a seat cushion connected to the first and second spaced side arms in such a manner as to be pivotal between a horizontal in-use position and an upright folded position relative to the seatback, a first latching mechanism for latching the seat cushion to the first side arm when the same assumes one of the horizontal in-use position and the upright folded position, a second latching mechanism for latching the second side arm to the floor when the second side arm assumes the upright position, a third latching mechanism for latching the first side arm to the floor when the first side arm assumes the upright position, and an unlatching mechanism for making the second latching mechanism inoperative when the seat cushion assumes the upright folded position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
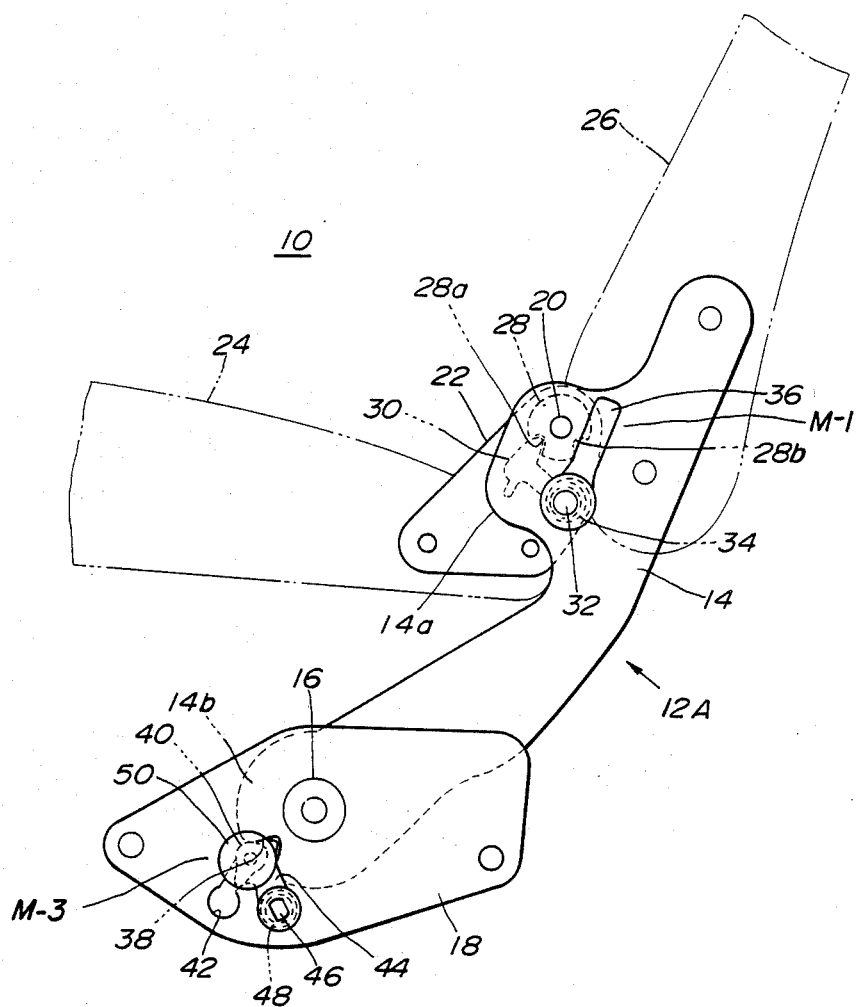
FIGS. 1 and 2 are side views of a left-positioned pivot mechanism of a folding seat according to the present invention.
Figure 2:
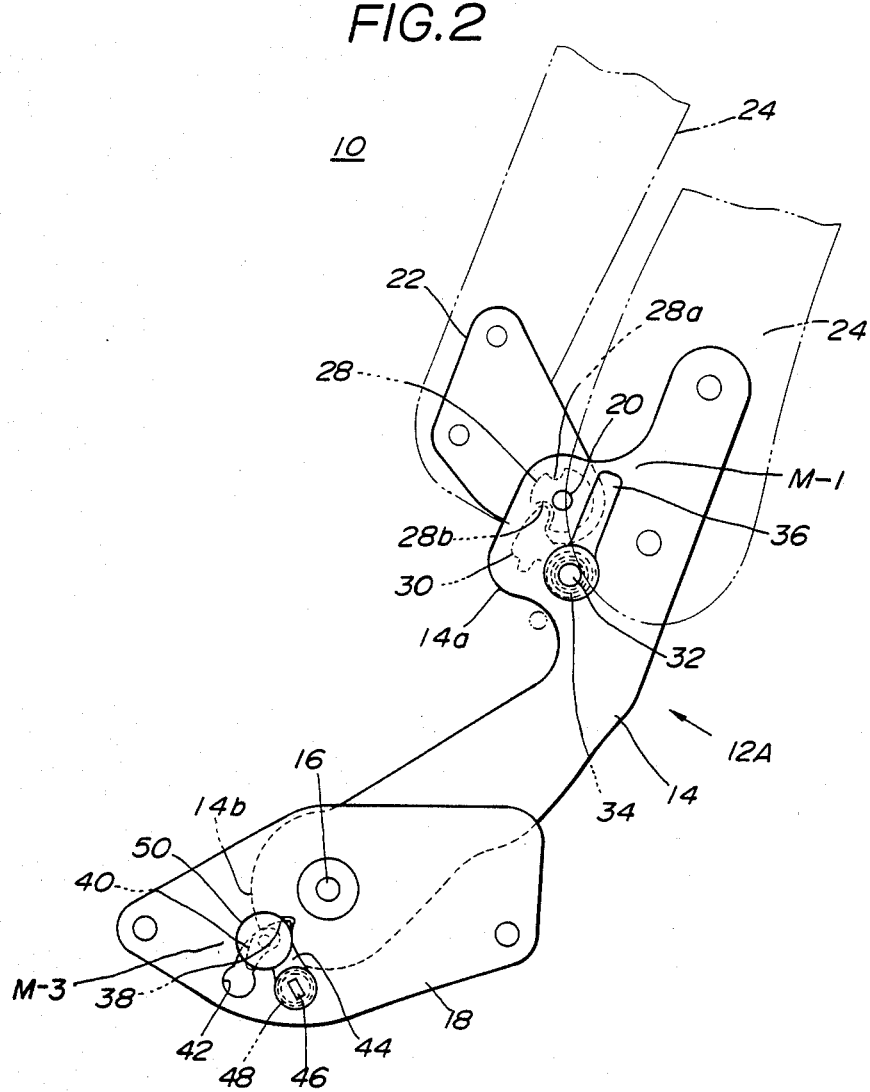
Figure 3:
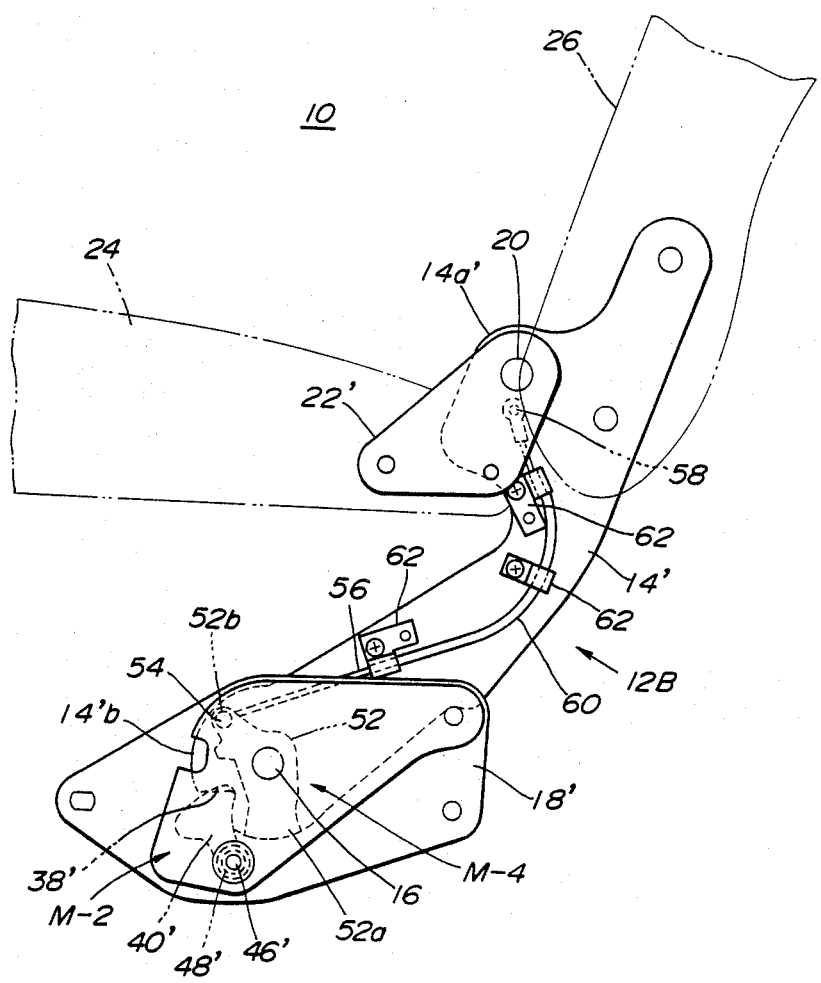
FIGS. 3 and 4 are side views of a right positioned pivot mechanism of the folding seat of the invention.
Figure 4:
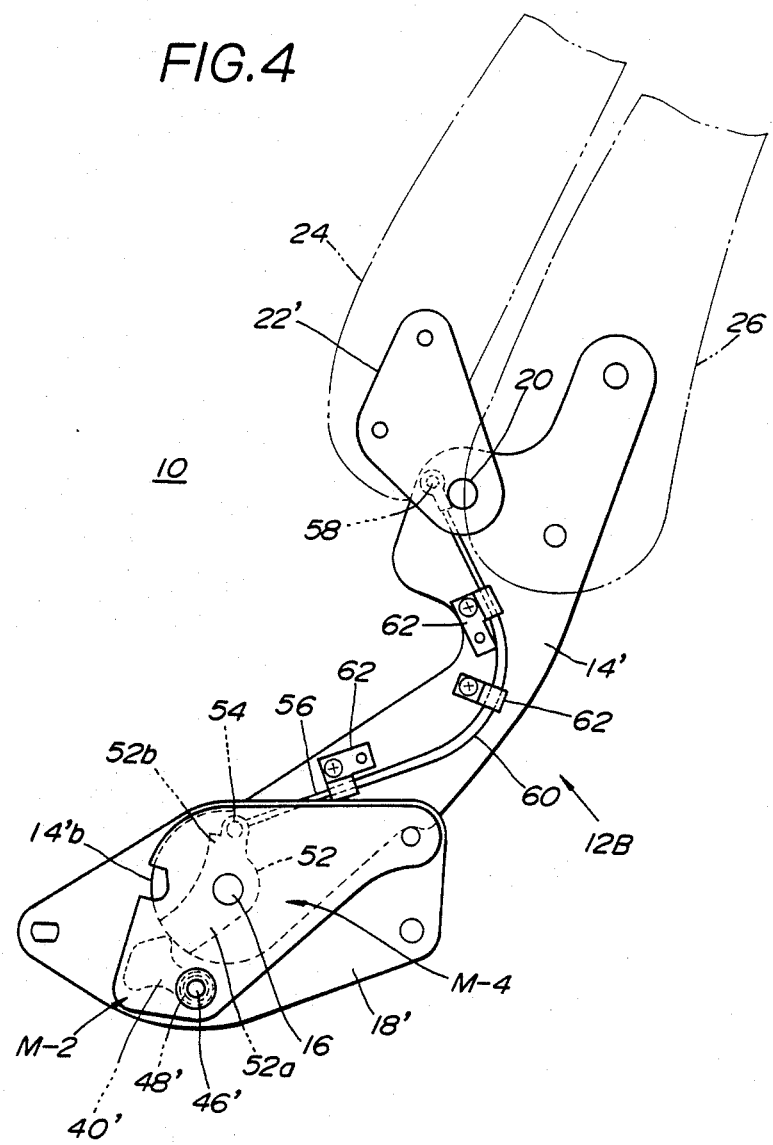
Figure 5:
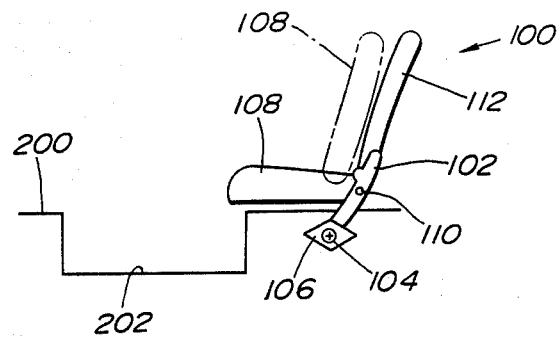
FIGS. 5, 6 and 7 are schematically illustrated side views of the afore-mentioned conventional folding seat, showing various conditions of the same respectively.
Figure 6:
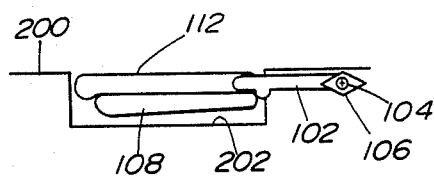
Figure 7:
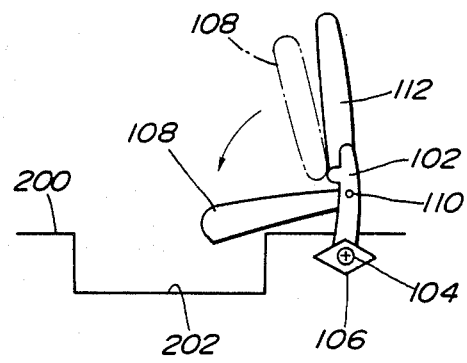

Referring to FIGS. 1 to 4, there is shown an essential part of a folding seat 10 according to the present invention. More specifically, FIGS. 1 and 2 show a left-positioned pivot mechanism 12A of the folding seat 10, while, FIGS. 3 and 4 show a right-positioned pivot mechanism 12B of the same. As will become apparent as the description proceeds, these pivot mechanisms 12A and 12B function not only to pivot and latch the entire seat 10 relative to a vehicle floor on which the seat 100 is mounted, but also to pivot and latch the seat cushion relative to the seatback.

Referring to FIGS. 1 and 2, particularly FIG. 1, there is shown the left-positioned pivot mechanism 12A which is arranged at the left side of the seat 10. The mechanism 12A comprises a left side arm 14 the lower end of which is pivotally connected through a pivot shaft 16 to a left retaining plate 18 secured to a left-positioned vertical wall not shown of the vehicle floor. As shown, the side arm 14 is formed at its upper half with a forwardly projected enlarged portion 14a. Pivotally connected to this enlarged portion 14a through a pivot shaft 20 is a left bracket 22 which is secured, from within, to a left side rear portion of a seat cushion 24. The upper portion of the side arm 14 is secured to a left side lower portion of a seatback 26.

Referring to FIGS. 3 and 4, particularly FIG. 3, there is shown the right-positioned pivot mechanism 12B which is arranged at the right side of the seat 10. The mechanism 12B comprises a right side arm 14' the lower end of which is pivotally connected through the aforementioned pivot shaft 16 to a right retaining plate 18' secured to a right-positioned vertical wall (not shown) of the vehicle floor. Similar to the afore-mentioned left side arm 14, the right side arm 14' of this mechanism 12B is formed at its upper half with a forwardly projected enlarged portion 14a'. Pivotally connected to this enlarged portion 14a' through the afore-mentioned pivot shaft 20 is a right bracket 22' which is secured, from within, to a right side rear portion of the seat cushion 24. The upper portion of the side arm 14' is secured to a right side lower portion of the seatback 26. With the arrangement as described hereinabove, it will be appreciated that both the seat cushion 24 and the seatback 26 are pivotal relative to the vehicle floor, and the seat cushion 24 is pivotal relative to the seatback 26.

Referring back to FIG. 1, first and third latching mechanisms M-1 and M-3 are mounted to the left side arm 14. As will become clear hereinafter, the first latching mechanism M-1 functions to latch the seat cushion 24 when the seat cushion 24 is pivoted up to its upright folded position, while, the third latching mechanism M-3 functions to latch the left side arm 14 when the arm 14 is raised up to its operative upright position.

Referring to FIG. 3, there are shown a second latching mechanism M-2 and an unlatching mechanism M-4 which are mounted to the right side arm 14', which function respectively to latch the right side arm 14' when the side arm 14' is raised up to its operative upright position and to cancel the latched condition of the right side arm 14' when the seat cushion 24 is raised up to its upright folded position.

As is best understood from FIG. 1, the first latching mechanism M-1 comprises a notched circular plate 28 which is rotatably disposed about the pivot shaft 20 and secured to the bracket 22 to move therewith about the pivot shaft 20. The circular plate 28 is formed with circumferentially spaced first and second notches 28a and 28b at the peripheral portion thereof. Positioned near the circular plate 28 is a latch pawl 30 which is pivotally connected through a pivot pin 32 to the enlarged portion 14a of the side arm 14. A coil spring 34 is disposed about the pivot pin 32 to bias the latch pawl 30 toward the notched circular plate 28. The latch pawl 30 is integrally formed with a manually operated handle 36. The notched circular plate 28 is oriented relative to the bracket 22 so that when the seat cushion 24 is moved with the bracket 22, it assumes its horizontal in-use position as shown in FIG. 1. The latch pawl 30 is in engagement with the first notch 28a of the circular plate 28 thereby to latch the seat cushion 24 at the in-use position. When the seat cushion 24 is raised up from the horizontal in-use position to its upright folded position as shown in FIG. 2, the latch pawl 30 is brought into engagement with the second notch 28b of the circular plate 28 thereby to latch the seat cushion 24 at this folded position. These latched conditions of the seat cushion 24 are cancelled by turning the handle 36 of the seat latch pawl 30 in a counterclockwise direction in FIGS. 1 and 2 against the biasing force of the coil spring 34.

As is seen from FIG. 1, the third latching mechanism M-3 comprises a notched lower portion 14b of the left side arm 14, the notch being designated by numeral 38. As shown, the lower portion 14b of the left side arm 14 is rounded to be concentric with the pivot shaft 16. Positioned near the notched lower portion 14b is a latch pawl 40 which has a normally bent shank portion 44. The shank portion 44 passes through an arcuate slot 42 formed in the left retaining plate 18 and extends over the outside surface of the plate 18 and is pivotally connected through a pivot pin 46 to the retaining plate 18. A coil spring 48 is disposed about the pivot pin 46 to bias the latch pawl 40 toward the notched lower portion 14b of the left side arm 14. A knob 50 is fixed to the latch pawl 40 for facilitating manipulation of the same. The positional relationship between the notched lower portion 14b of the left side plate 14 and the latch pawl 40 is so made that when the side plate 14 assumes its operative upright position as shown in FIG. 1, the latch claw 40 is in engagement with the notch 38 thereby to latch the side plate 14 at the upright position. This latched condition can be cancelled by moving the knob 50 away from the notch 38 against the biasing force of the spring 48.

As is seen from FIG. 3, the second latching mechanism M-2 comprises a notched lower portion 14'b of the right side arm 14', the notch being designated by numeral 38'. The lower portion 14'b of the side arm 14' is rounded to be concentric with the pivot shaft 16. Positioned near the notched lower portion 14'b is a latch pawl 40' which is pivotally connected through a pivot pin 46' to the right retaining plate 18'. A coil spring 48' is disposed about the pivot pin 46' to bias the latch pawl 40' toward the notched lower portion 14'b of the right side arm 14'. Similar to the case of the afore-mentioned third latching mechanism M-3, when the right side arm 14' assumes its operative upright position as shown in FIG. 3, the latch pawl 40' is in engagement with the notch 38' thereby to latch the side plate 14' at the upright position. However, unlike the case of the third latching mechanism M-3, this latched condition is cancelled by the unlatching mechanism M-4 which will be described in detail hereinbelow.

The unlatching mechanism M-4 comprises a lever 52 which is rotatably disposed at its central portion about the pivot shaft 16. The lever 52 is so sized and constructed so that when the lever 52 is turned to a given angular position as shown in FIG. 4, one end 52a of the lever 52 pushes the latch pawl 40' away from the notch 38' of the side arm 14'. The other end 52b of the lever 52 is equipped with a pivot pin 54 from which a cable 56 extends to the right bracket 22'. The leading end of the cable 56 is pivotally connected to the right bracket 22' through a pivot pin 58. The cable 56 is slidably received in a tube 60 which is secured to the right side arm 14' through retainers 62. Thus, it will be appreciated that when the seat cushion 24 is pivoted upward from the horizontal in-use position as shown in FIG. 3, the cable 56 is pulled upward thereby to turn the lever 52 clockwise in FIG. 3. In the disclosed embodiment, the lever 52 comes to the given angular position as shown in FIG. 4 when the seat cushion 24 is pivoted to the upright folded position.

In the following, operation of the folding seat will be described. For ease of description, it will be commenced with respect to an in-use condition of the seat 10 wherein, as is shown in FIGS. 1 and 3, the left and right side arms 14 and 14' and thus the seatback 26 secured to them are at the upright latched positions and the seat cushion 24 is in its horizontal latched position. That is, under this condition, the latch pawls 40 and 40' of the third and second latching mechanisms M3 and M-2 are engaged with the respective notches 38 and 38' of the left and right retaining plates 18 and 18', and the latch pawl 30 of the first latching mechanism M-1 is engaged with the first notch 28a of the circular plate 28.

When folding the seat 10 is required, the handle 36 of the first latching mechanism M-1 is pushed forward to disengage the latch pawl 30 from the first notch 28a of the circular plate 28 and then with the handle 36 kept pushed forward, the seat cushion 24 is pulled upward. Because of cancellation of the latched condition, the seat cushion 24 is allowed to pivot upward. When the seat cushion 24 comes to the upright folded position as shown in FIG. 2, the latch pawl 30 is brought into engagement with the second notch 28b of the circular plate 28 to latch the seat cushion 24 at the folded position. As is seen from FIGS. 3 and 4, during the pivoting movement of the seat cushion 24, the cable 60 of the unlatching mechanism is moved upward and thus turns the lever 52 to the given angular position cancelling the engagement between the latch pawl 40' and the notch 38' of the right side arm 14'.

Then, as is seen from FIG. 2, the knob 50 of the third latching mechanism M-3 is pressed forward to disengage the latch pawl 40 from the notch 38 of the left side arm 14, and then the seatback 26 is pushed forward while the knob 50 kept pressed forward. Because of the cancellation of the latched condition of the right and left side arms 14' and 14 relative to the right and left retaining plates 18' and 18, the seatback pushing induces forward inclination entire of the seat 10 about the pivot shaft 16. Because of the latched condition achieved by the first latching mechanism M-1, the seat cushion 24 does drop from the folded position during the forward inclination of the seat 10. Although not shown in the drawings, the entire seat 10 is thus inclined to its fully folded position. Under this fully folded condition, the left and right side arms 14 and 14' are not latched.

When seat setting is required, the seatback 26 and the folded seat cushion 24 are pulled upward and brought to the positions as shown in FIGS. 2 and 4. Upon the seatback 26 and the seat cushion 24 assuming these positions, the latch pawl 40 of the third latching mechanism M-3 is brought into engagement with the notch 38 of the left side arm 14 to latch the side arm 14. During the upward movement of the seatback 26, the seat cushion 24 keeps its folded position due to the work of the first latching mechanism M-1. Then, the handle 36 of the first latching mechanism M-1 is pushed forward to disengage the latch pawl 30 from the second notch 28b of the circular plate 28 and then the seat cushion 24 is pulled downward with the handle 36 kept pushed. With this, the seat cushion 24 is pivoted downward about the pivot shaft 32 and assumes the horizontal in-use position as shown in FIGS. 1 and 3. Accordingly, as is seen from FIG. 1, the latch pawl 30 is brought into engagement with the first notch 28a of the circular plate 28 on the left bracket 22 thereby to latch the seat cushion 24 at the horizontal in-use position. As is understood from FIGS. 4 and 3, during the downward pivoting of the seat cushion 24, the cable 56 of the unlatching mechanism M-4 is moved downward thereby turning the lever 52 to open the notch 38' of the right side arm 14'. Thus, upon the seat cushion 24 coming to the horizontal in-use position, the latch pawl 40' of the second latching mechanism M-2 is brought into engagement with the notch 38' to latch the right side arm 14' and thus the seat cushion 24.

As is described hereinabove, in the folding seat 10 of the present invention, the forward and rearward inclinations entire of the seat for the seat folding and the seat setting are safely carried out without dropping the seat cushion. Thus, undesirable matters originating from the drop of the seat cushion, such as those as mentioned in the description of the prior art do not occur.

What is claimed is:

1. A folding seat for use on a floor, comprising:
   first and second spaced side arms each having a lower end pivotally connected to said floor, each arm being pivotal between an upright position and a folded position with respect to said floor;
   a seatback secured to said first and second spaced side arms to move therewith;
   a seat cushion connected to said first and second spaced side arms in such a manner as to be pivotal between a horizontal in-use position and an upright folded position with respect to said seatback;
   a first latching mechanism for latching said seat cushion to said first side arm when the same assumes one of said horizontal in-use position and said upright folded position;
   a second latching mechanism for latching said second side arm to the floor when said second side arm assumes said upright position;
   a third latching mechanism for latching said first side arm to the floor when said first side arm assumes said upright position; and
   an unlatching mechanism for making said second latching mechanism inoperative when said seat cushion assumes said upright folded position.

2. A folding seat as claimed in claim 1, in which said first latching mechanism comprises:
   a notched circular plate positioned near said first side arm and secured to said seat cushion to pivot therewith, said circular plate being formed with first and second notches;
   a latch pawl pivotally connected to said first side arm said latch pawl being engageable with said first and second notches of said circular plate when said seat cushion assumes said horizontal in-use position and said upright folded position respectively; and
   biasing means for biasing said latch pawl toward said notched circular plate.

3. A folding seat as claimed in claim 2, in which said notched circular plate is secured to a bracket which is secured to one side of said seat cushion.

4. A folding seat as claimed in claim 3, in which said latch pawl is integrally formed with a handle which is to be manipulated.

5. A folding seat as claimed in claim 2, in which said second latching mechanism comprises:
   means defining a notch in a lower portion of said second side arm;
   a latch pawl pivotally connected to a fixed member of said floor, said latch pawl being engageable with said latch when said second side arm assumes said upright position; and
   biasing means for biasing said latch pawl toward the notched lower portion of said second side arm.

6. A folding seat as claimed in claim 5, in which said notched lower portion of the second side arm is rounded to be concentric with an axis about which said second side arm is pivoted.

7. A folding seat as claimed in claim 6, in which said unlatching mechanism comprises:
   a lever connected to said second side arm to be pivotal about said axis, said lever pushing said latch pawl away from the notch of the lower portion of the second side arm when said lever assumes a given angular position; and a cable having one end pivotally connected to one end of said lever and the other end pivotally connected to said seat cushion, the arrangement being so made that when said seat cushion is pivoted up to the upright folded position, said cable is moved to turn said level to the given angular position.

8. A folding seat as claimed in claim 7, in which said unlatching mechanism further comprises a tube in which said cable is slidably received, and retainers by which said tube is secured to said second side arm.

9. A folding seat as claimed in claim 7, in which said third latching mechanism comprises:

means defining a notch in a lower portion of said first side arm;

a latch pawl pivotally connected to a fixed member of the floor, said latch pawl being engageable with said notch when said first side arm assumes said upright position; and biasing means for biasing said latch pawl toward the notched lower portion of said first side arm.

10. A folding seat as claimed in claim 9, in which said third latching mechanism further comprises a knob which is secured to said latch pawl to facilitate manipulation of the same.

* * * * *